United States Patent
Schneider

(10) Patent No.: US 7,930,765 B2
(45) Date of Patent: Apr. 19, 2011

(54) CONTROL OF CONSUMPTION OF MEDIA OBJECTS

(75) Inventor: Peter Schneider, Vantaa (FI)

(73) Assignee: Nokia Corporation, Espoo (FI)

(*) Notice: Subject to any disclaimer, the term of this patent is extended or adjusted under 35 U.S.C. 154(b) by 1055 days.

(21) Appl. No.: 10/880,603

(22) Filed: Jul. 1, 2004

(65) Prior Publication Data
US 2005/0234830 A1    Oct. 20, 2005

(30) Foreign Application Priority Data
Apr. 19, 2004    (FI) ...................................... 20040553

(51) Int. Cl.
*H04L 29/12* (2006.01)
*G06F 21/00* (2006.01)
*G06Q 30/00* (2006.01)

(52) U.S. Cl. .......................................... 726/31; 705/57

(58) Field of Classification Search .................... 705/51, 705/52, 53, 14.11, 14.35, 14.48, 59, 61, 65–66, 705/68, 902–903, 909; 713/193–194, 185, 713/158–159; 726/9–10, 5–7, 18–20, 31
See application file for complete search history.

(56) References Cited

U.S. PATENT DOCUMENTS

| | | | | |
|---|---|---|---|---|
| 5,752,041 A * | 5/1998 | Fosdick | ........................ | 717/178 |
| 6,289,452 B1 * | 9/2001 | Arnold et al. | .................. | 713/175 |
| 6,885,748 B1 * | 4/2005 | Wang | .............................. | 705/51 |
| 7,206,765 B2 * | 4/2007 | Gilliam et al. | ................... | 705/51 |
| 2002/0114466 A1 * | 8/2002 | Tanaka et al. | .................. | 380/232 |
| 2002/0184156 A1 | 12/2002 | Tadayon et al. | | |
| 2004/0006542 A1 | 1/2004 | Gilliam et al. | | |
| 2004/0205028 A1 * | 10/2004 | Verosub et al. | .................. | 705/59 |
| 2004/0268146 A1 * | 12/2004 | Oberst | ........................... | 713/201 |

FOREIGN PATENT DOCUMENTS

| KR | 2003-0097465 | 12/2003 |
|---|---|---|
| WO | WO 03/005145 A2 | 1/2003 |

OTHER PUBLICATIONS

Reihaneh, et al.; "Import/Export in Digital Rights Management", Oct. 25, 2004, pp. 99-110.
Iannella Renato, "Open Digital Rights Language (ODRL)", version 1.1, www.odrl.net/1.1/ORDL-11-pdf> Aug. 8, 2002, pp. 1-68.
KR Office Action, KR patent application No. 7021751/2006, Nov. 7, 2008, a total of 5 pages.

* cited by examiner

*Primary Examiner* — Minh Dinh
*Assistant Examiner* — Venkat Perungavoor
(74) *Attorney, Agent, or Firm* — Squire, Sanders & Dempsey (US) LLP

(57) ABSTRACT

A method and mechanism controls consumption of media objects in a communication terminal, especially in a mobile terminal. A media object, such as a game, and an associated rights object are stored in a communication terminal. The rights object defines usage rules for the media object. Sales parameters are accepted from a user of the terminal. The sales parameters indicate that the user is willing to sell the rights of consumption of the media object to a certain extent. Upon receiving this indication, the media object is prevented from being consumed in the communication terminal more than what is defined by the usage rules and the certain extent. A sell offer may then be transferred to a trading entity.

26 Claims, 4 Drawing Sheets

CONTROL OF CONSUMPTION OF MEDIA OBJECTS

FIELD OF THE INVENTION

The present invention relates generally to control of consumption of digital content residing in a communication terminal, especially in a mobile terminal. More particularly, the invention relates to a mechanism for controlling consumption of media objects stored in a communication terminal and protected from illegal use. Media objects here refer to digital content the usage of which is governed by rights associated with the content. A media object may any be any digital resource that can be used, i.e. consumed, in the terminal, such as a ringing tone or a game, or a composite object comprising media objects of different types.

BACKGROUND OF THE INVENTION

The current development towards truly mobile computing and networking has brought on the evolvement of various access technologies, which also provide the users with access to the Internet when they are outside their own home network. The first public communication network that provides a truly ubiquitous World Wide Web (WWW) access is the GSM-based mobile telephone network.

So far, the use of the Internet has been dominated by person-to-machine communications, i.e. information services. The evolution towards so-called third generation (3G) wireless networks brings along mobile multimedia communications, which will also change the way IP-based services are utilized in public mobile networks.

The new multimedia capable mobile terminals (multimedia phones) provide an open development platform for application developers, allowing independent application developers to design new services and applications for the multimedia environment. The users may, in turn, download new content, such as music or software, to their mobile terminals and use them therein. Therefore, a mechanism is also required in the network for protecting the rights of the content owners and for preventing illegal use of the content.

Digital Rights Management (DRM) is a technology developed by the Open Mobile Alliance (OMA) for securing, selling, and distributing digital content in a mobile environment. In the first DRM specification, the system includes three levels of functionality, which are termed forward lock, combined delivery, and separate delivery. In forward lock, a hard-coded feature in the terminal prevents the user from copying or forwarding the content downloaded in the terminal. Typical present-day downloadable content, such as ringing tones or logos, is protected by the forward lock mechanism. In combined delivery, a rights definition, termed rights object, is added to the DRM message delivered to a terminal. The DRM message thus includes two elements: the content and the rights object. The rights object defines permissions and constraints for the usage of the content, such as the number of days or the number of times the content may be used. The combined delivery also utilizes forward lock: neither the content nor the rights object can be forwarded after they have been downloaded to a terminal. In separate delivery, which is intended to protect higher value content, the content and the rights object may be delivered separately. The content is encrypted into so-called DRM Content Format (DCF) and the rights object contains a key (CEK, Content Encryption Key) for decrypting the content in the terminal. The content may thus be delivered through an insecure channel, while a more secure channel is used to deliver the rights object. Typically, Wireless Application Protocol (WAP) push is used to deliver the rights object via Short Message Service (SMS).

The separate delivery enables so-called super-distribution, which allows the content, but not the rights object, to be forwarded to another terminal. When the content is to be forwarded, metadata including location information of the application server of the issuer of the rights is inserted in the DCF object to be forwarded. The terminal receiving the DCF object, i.e. the content, contacts the application server by opening a browsing session, which allows the user to choose the kind of rights he or she desires. The rights object with the key required for decrypting the content is then delivered through a secure channel to the terminal.

A drawback related to the current DRM mechanism is its inflexibility as to the management of the rights. Although content may be delivered to other users, the rights objects remain locked in the terminal, and a new rights object has to be acquired, even though the user delivering the content would be willing to give up the rights too. As there is no mechanism for forwarding the rights, some of the rights already acquired may remain unconsumed for good.

The present invention seeks to eliminate the above-described drawback and to improve the flexibility of the DRM system.

SUMMARY OF THE INVENTION

The present invention seeks to bring about a novel mechanism for the handling and management of rights objects related to digital content stored in a terminal. The present invention further seeks to bring about a mechanism that allows the user more flexibility and freedom in handling the rights acquired for downloaded content, without compromising the rights of the issuer of the content.

In the present invention, a user of a terminal may define that he or she is willing to sell the rights related to a certain media object, such as a game, to a certain extent. When the user has given this indication, the terminal blocks the media object so that it cannot be anymore consumed more than to the point where the associated rights are left in said certain extent. For example, if the user indicates his or her willingness to sell 100 out of 250 currently owned executions of a certain game, the terminal blocks the game so that it cannot anymore be executed more than 150 times, i.e. that the game remains inaccessible for the 100 executions intended to be sold. The terminal may then send a sell offer to a trading entity, such as a trading server on a communication network, indicating that one hundred executions of said game are for sale.

Thus, one embodiment of the invention is the provision of a method for controlling consumption of media objects in a communication terminal. The method includes the steps of storing a media object and an associated rights object in a communication terminal, the rights object defining usage rules for the media object; accepting sales parameters from a user, the sales parameters indicating that rights of consumption of the media object are for sale to a certain extent; and preventing the media object from being consumed in the communication terminal more than what is defined by the usage rules and said certain extent.

In another embodiment the invention provides a terminal for a communication system. The terminal includes storage means for storing a media object and an associated rights object, the rights object defining usage rules for the media object; first means for accepting sales parameters from a user, the sales parameters indicating that rights of consumption of the media object are for sale to a certain extent; and second means, responsive to the first means, for preventing the media object from being consumed in the communication terminal more than what is defined by the usage rules and said certain extent.

In a still further embodiment, the invention provides a computer usable medium having computer readable program code embodied therein to enable a communication terminal to control consumption of media objects stored in the communication terminal together with an associated rights object defining usage rules for the media object. The computer readable program code includes computer readable program code for accepting sales parameters indicating that rights of consumption of the media object are for sale to a certain extent and for preventing the media object from being consumed in the communication terminal more than what is defined by the usage rules and said certain extent.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIG. 1 to 6 in the appended drawings, wherein.

DETAILED DESCRIPTION OF THE INVENTION

Figure 1:
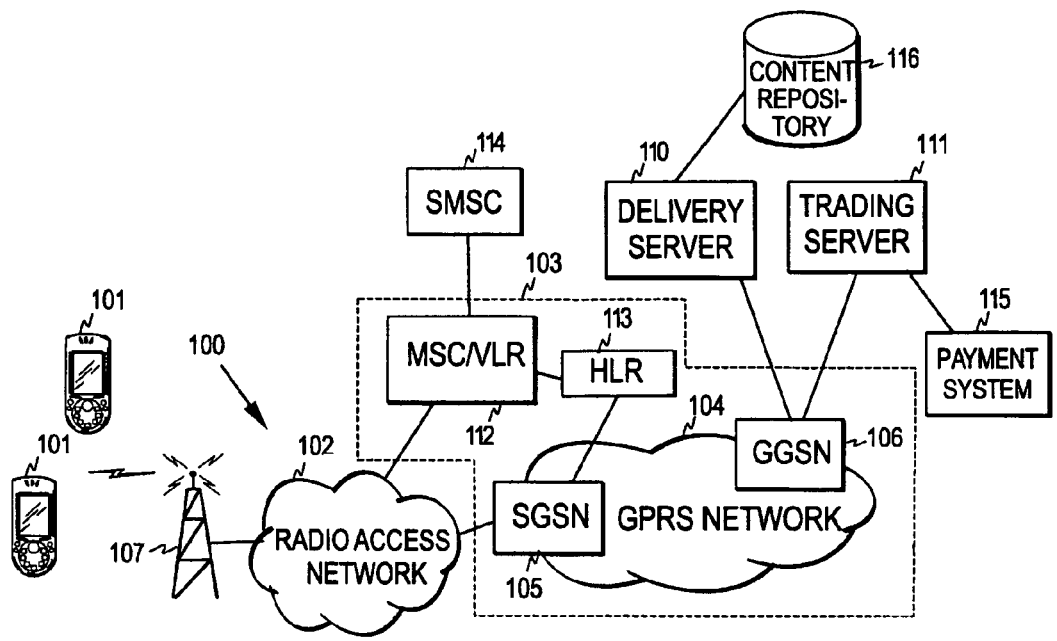
FIG. 1 illustrates an example of a communication environment in which the principles of the present the invention may be beneficially implemented.

FIG. 1 shows an example of a general communication environment in which the present invention can be applied. As is commonly known, a cellular system 100 consists of three interacting domains: user equipment 101, a Radio Access Network (RAN) 102, and a Core Network (CN) 103. The Core Network is divided into circuit-switched and packet-switched domains, the former being responsible for the traditional circuit-switched services and the latter for packet-switched services. The circuit-switched domain is connected via a Mobile services Switching Centre (MSC) 112 and the packet-switched domain, which is formed by a General Packet Radio Service (GPRS) network 104, via a Serving GPRS Support Node (SGSN) 105, to the Radio Access Network. The MSC comprises a Visitor Location Register (VLR), which is a database holding copies of the service profiles of visiting users and information on the location of the mobile terminals. The MSC/VLR is further connected to external circuit-switched networks, such as Public Switched Telephone Networks (PSTNs). Some network elements of the Core Network, such as the Home Location Register (HLR) 113, are shared by the packet-switched domain and the circuit-switched domain. The Radio Access Network comprises a plurality of base stations 107 with which mobile terminals 101 communicate through a radio interface. The user of a mobile terminal is thus a subscriber in a cellular communication system, such as the GSM or UMTS system.

In this example, a delivery server 110 and a trading server 111 are connected to the GPRS network 104, either directly or through another packet data network, such as the public Internet. Although FIG. 1 so shows, the said servers do not have to be connected to the GPRS network through the same GGSN.

The delivery server 110 stores, or has access to a content repository 116 which stores, media objects that may be downloaded to the mobile terminals. It is further assumed here that the delivery server is the network element responsible for sending the rights objects to the mobile terminals that have downloaded content from the server, i.e. that the delivery server also acts as the issuer of the rights. As indicated above, the rights objects may be transmitted to the terminals through a Short Message Service Center (SMSC) 114, for example, which is the network element that stores and forwards the short messages sent in the cellular system. The SMSC is connected to the MSC through a signaling network, such as the SS7 network.

The trading server 111 is a mediating network element that enables trading of the rights associated with the media objects. The trading server maintains a list of rights being on sale, a sales catalogue, and conducts the sales transactions between the mobile terminals. The operation of the trading server is discussed in more detail in connection with FIG. 3. The trading server is further connected to an electronic payment system 115, which may be any system suitable for online electronic commerce payments.

Figure 2:
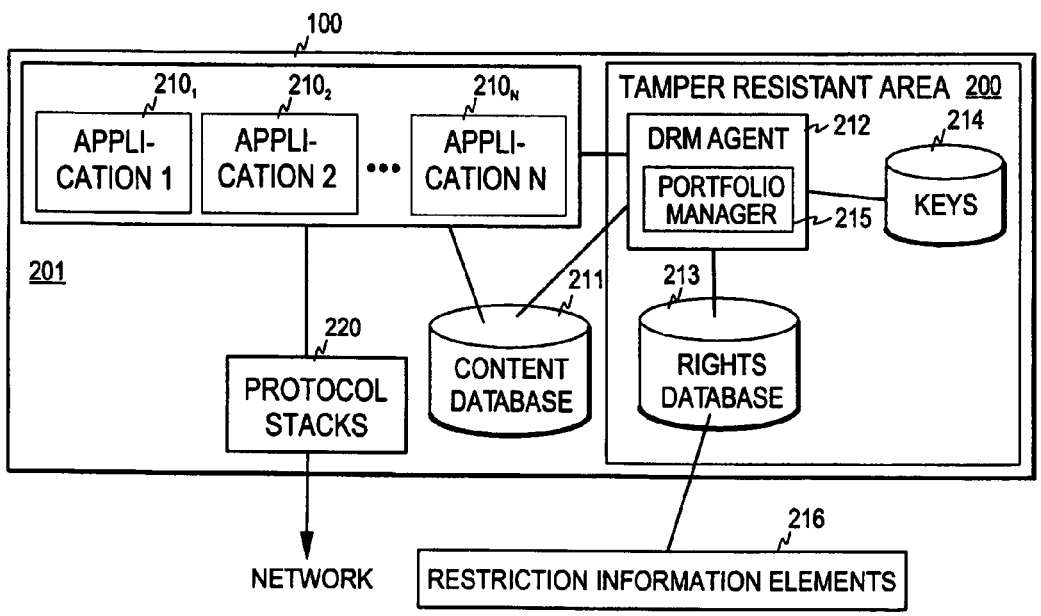
FIG. 2 is a block diagram illustrating the basic elements of one embodiment of a mobile terminal according to the invention.

FIG. 2 is a schematic illustration of the basic elements of one embodiment of a terminal according to the invention. The entities relevant to the invention reside either in a tamper resistant area 200 of the terminal or in an open platform area 201. In this example, the tamper resistant area includes a trusted agent 212, which acts as a controlling entity controlling the rights related to different media objects stored in the terminal. In a DRM environment, the trusted agent acts as a DRM agent, i.e. as an entity that enforces the rights and controls the consumption of the media objects residing in the terminal. The tamper resistant area further includes a rights database 213 holding the rights objects related to the DRM media objects stored in the terminal.

The open platform area may include a plurality of applications $210_1$ to $210_N$ which may also be downloaded from the delivery server 110. The applications may also reside in a content database 211, which holds DRM content downloaded from one or more delivery servers. As described above, when the user of the terminal downloads content, the content and the associated rights object are delivered to the terminal, either together or separately. The DRM agent stores the content in the content database and the associated rights object in the rights database residing in the tamper resistant area of the terminal. The applications access the network through a protocol stack 220, which may be a (w)TCP/IP stack, for example.

The tamper resistant area may further include a separate key database 214 for the keys needed in the DRM system. The keys include the content encryption keys needed for decrypting the encrypted content, and possibly also other keys or certificates needed in the DRM system (the next release of the DRM specification is believed to include a more sophisticated security model). When the user wishes to consume content, the corresponding application contacts the DRM agent, which then checks the associated rights object and allows the consumption (i.e. the decryption of the content) if the rights object indicates that the current rights are sufficient for the consumption.

In addition to its above-described normal operation, the DRM agent 212 includes functionalities for trading rights in the network. It is assumed here that the functionalities required for this trading, i.e. the novel features of the DRM agent, are implemented in a separate module of the DRM agent, which is here termed the portfolio manager and denoted with reference number 215. As discussed below, the portfolio manager manages and maintains information about restrictions imposed on the rights currently owned by the user of the terminal. This information may be in the form of one or more restriction information elements 216, which may be stored in the rights database or elsewhere in the tamper resistant area of the terminal. The portfolio manager also maintains information about the rights being currently for sale so that the user may view, in regard to each media object, whether the corresponding rights have been set for sale, and if so, to what extent.

Figure 3:
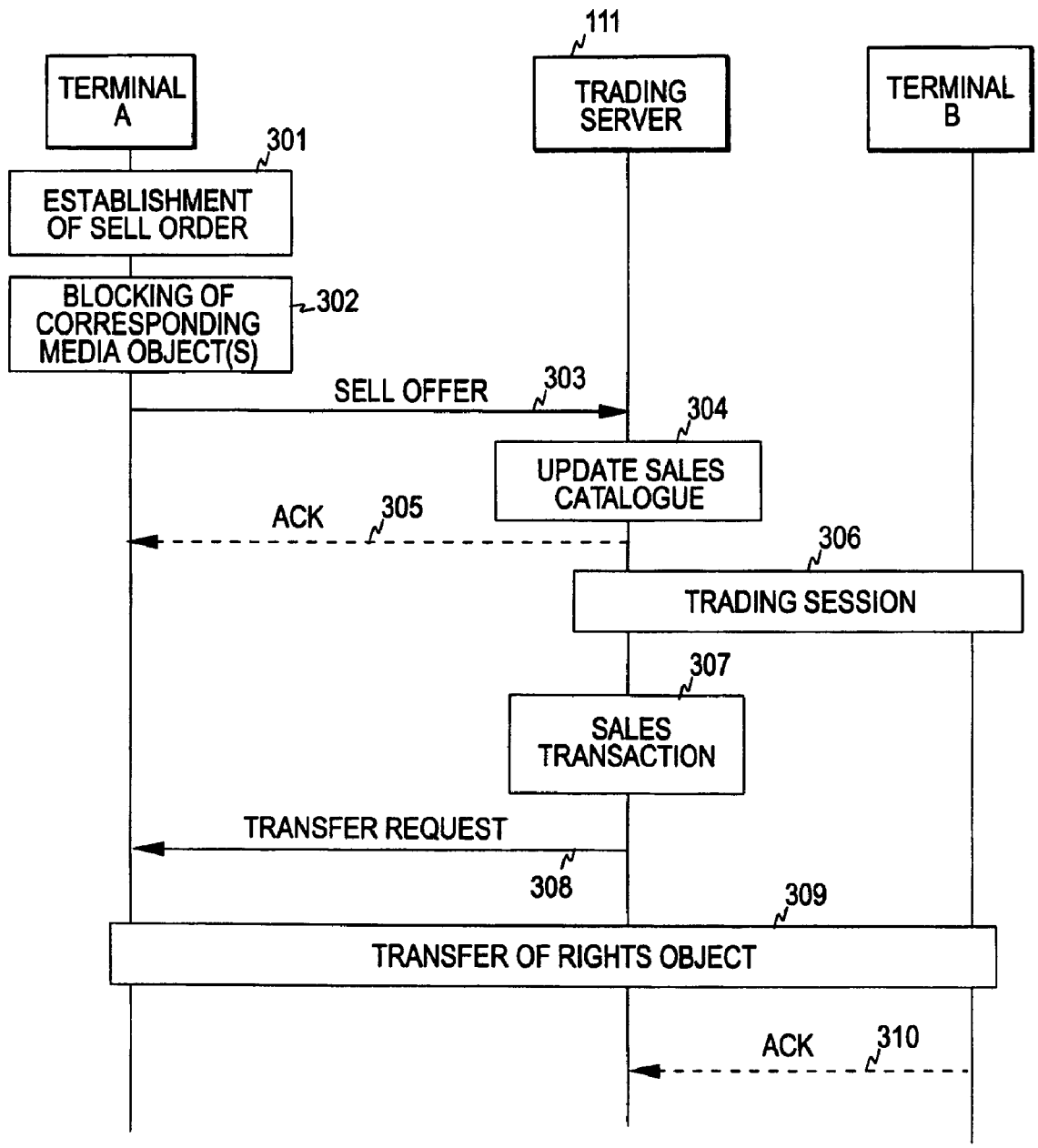
FIG. 3 illustrates one embodiment of a message exchange between different entities of the system of the invention.
Figures 4, 5:
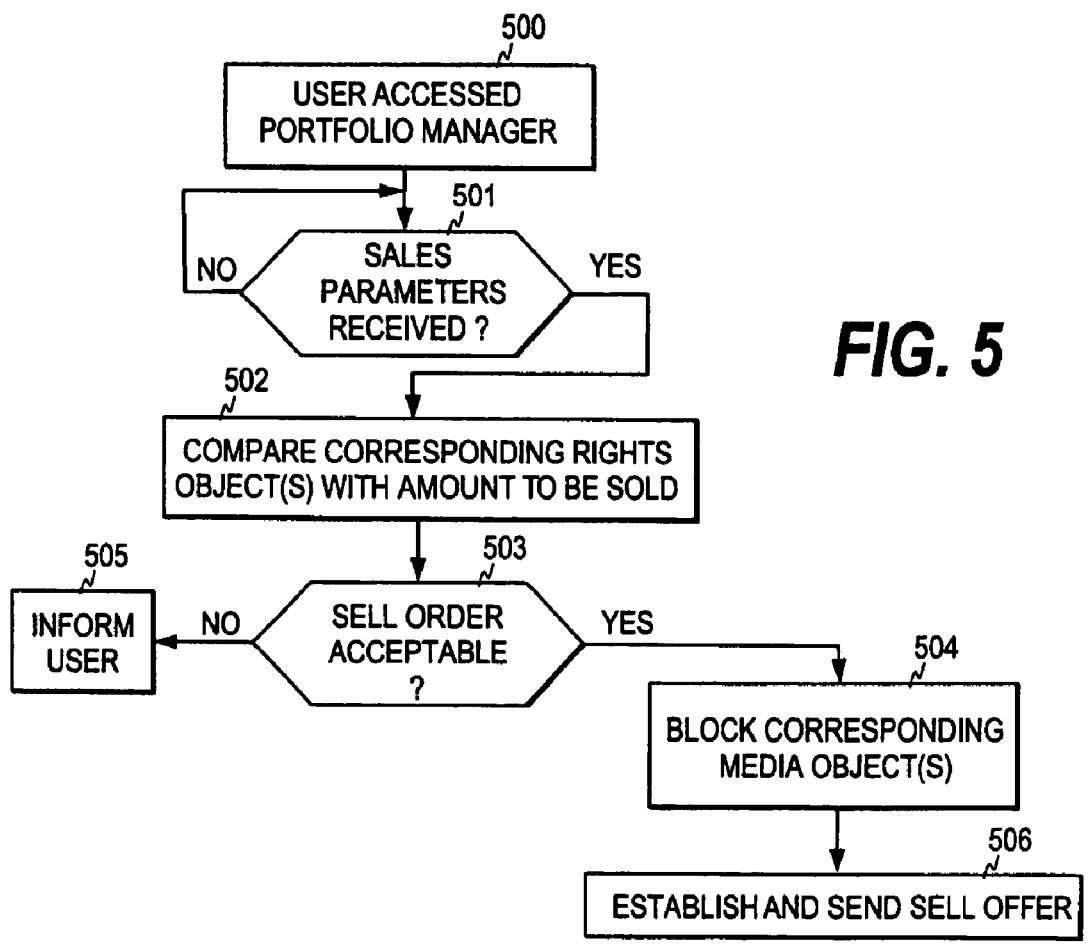
FIG. 4 shows an example of a user view when rights are offered for sale.
FIG. 5 is a flow diagram illustrating one embodiment of the operation of a DRM agent according to the invention.

FIG. 3 illustrates one embodiment of the operation of a system according to the invention. When the user of a mobile terminal 101, here termed terminal A, wants to sell all or part of the rights belonging to a certain media object, such as a game, he/she opens the DRM portfolio manager through the user interface of the terminal. Through the user interface the user may then check the current statuses of the rights currently owned, and establish a sell order. The establishment of the sell order involves the user setting values for certain sales parameters, such as the identity of the media object, the amount of the rights to be sold, and the price desired. This phase is denoted with reference number 301 in FIG. 3. FIG. 4 shows an example of the user view after the sell order has been established.

Referring to FIG. 3 again, when the user accepts the sell order established, by pushing the accept button for example, the DRM agent blocks the corresponding media object(s) at step 302. The blocking of a media object here refers to an operation in which the mobile terminal prevents the corresponding media object(s) from being consumed in the communication terminal more than what is anymore acceptable after the user has defined and accepted the sell order. In other words, if the user has defined at step 301 that the rights related to a certain media object are to be sold to a certain extent, such as 50 out of 100 executions owned currently, the DRM agent makes modifications or additions that indicate that the consumption of the media object is henceforth allowed only as long as the amount of the rights left in the terminal exceeds said certain extent. The DRM agent thus blocks the consumption of the media object to the said certain extent, such as 50 executions, which corresponds to the amount of rights intended to be sold. Depending on the extent of the rights that the user intends to sell, the media object(s) may also be made inaccessible immediately after the user has defined and accepted the sell order.

FIG. 5 shows one embodiment of the operation of the DRM agent at step 302. When the user has established a sell order and accepted it, the portfolio manager may first check, by comparing the amount to be sold, as defined by the user, with the current status of the rights, whether the sell order given by the user is acceptable, i.e. whether the amount to be sold can be covered by the current amount of rights (steps 501 to 503). If this is not the case, the user is informed that the rights to be sold must be further limited (step 505). Otherwise the portfolio manager blocks the corresponding media object(s) at step 504 so that it/they cannot be consumed more than to the point where the associated rights are left to said certain extent.

The blocking of a media object may be performed by updating or modifying the corresponding rights object or by leaving the original rights object intact and adding one or more restriction information elements 216 to the tamper resistant area. In a combined embodiment, the restriction information element(s) may indicate when the modification of the rights object will take place. The rights object or a restriction information element may thus indicate that the corresponding media object is inaccessible, or a new limit for the consumption of the media object may be indicated in the rights object or in a restriction information element. If restriction information elements are utilized, the DRM agent checks both the rights object and the associated restriction information element when the user wishes to consume a media object. If the user wishes to sell the current rights to their full extent, the portfolio manager makes the media object inaccessible immediately. Otherwise the portfolio manager may first store the new consumption limit indicating the point beyond which the consumption of the media object is prohibited, thereby also allowing the DRM agent to display the new limit to the user. If the consumption reaches the new limit, the portfolio manager makes the media object inaccessible. This may again be implemented by modifying the corresponding rights object and/or the corresponding restriction information element, if a restriction information element has already been added, or by adding a new restriction information element indicating that the media object is now inaccessible.

The desired media object may also be blocked by making the corresponding rights object inaccessible. If the rights object is blocked, the DRM agent then knows that the corresponding media object is also inaccessible. A restriction information element added to the tamper resistant area may indicate that the media object is inaccessible or it may also define when the consumption ban, i.e. the inaccessibility, comes into force.

A pointer pointing to the corresponding restriction information element may be added to the rights object. The restriction information elements may be created, for example, by using the same Rights Expression Language (REL) as used in a DRM environment to create the rights objects. If the original rights objects are updated to indicate the new limits for the consumption, the portfolio manager may still add information, which the portfolio manager may use to indicate to the user of the terminal that certain rights are currently for sale to a certain extent.

When the blocking has been performed, the DRM agent constructs a sell offer message based on the sell order established by user interaction, and triggers the sending of the sell offer message (step 506). The sell offer message includes at least the identity of the media object to be sold and the extent of the rights for sale. It is also possible that the sell offer message includes the rights object. However, in this case the rights object is modified to indicate the extent of the rights for sale. The information defining the rights offered for sale may be created by the above-mentioned Rights Expression Language, for example.

With reference to FIG. 3 again, the sending of the sell offer message is denoted by reference numeral 303. Upon receiving the sell offer message from terminal A the trading server updates its sales catalogue by adding a corresponding sell offer to the rights that are currently for sale on the trading server (step 304). Having taken the rights successfully for sale, the trading server may send an acknowledgment to the terminal (step 305).

The operation of the trading server may correspond to that of existing platforms for trading stocks and commodities. The trading server may, for example, keep an order book for offers and bids, mediate payments between the parties, and log executed transactions.

When a user of another terminal, here termed terminal B, intends to buy rights for a certain media object, such as the media object terminal A has set for sale, the user may open a trading session with the trading server (step 306) and browse the sales catalogue on the trading server to find out whether the trading server has the desired rights for sale. If the user finds the desired rights and confirms a purchase, the trading server conducts a sales transaction (step 307). This involves deletion of the sell offer from the sales catalogue and use of the electronic payment system 115, to which the trading server has access, for deducting the agreed sum of money from the account or wallet of the purchasing party and for crediting the account or wallet of the selling party.

Having conducted the sales transaction, the trading server may initiate the transfer of the rights object to the purchasing party, i.e. to terminal B (step 308). The trading server may generate a new rights object for the terminal purchasing the rights or it may request, as shown in the figure, the selling terminal to forward the rights object to the purchasing terminal. The transfer of the rights object may take place either directly from the selling terminal to the purchasing terminal, or through the trading server. The DRM agent of the selling party may modify the rights object prior to its transfer to make the rights object consistent with the rights sold, or the modification may be made in the trading server, if the rights object is transferred through it. In another embodiment, the trading server may request the delivery server to deliver a new rights object to terminal B. In this case, terminal A is informed of the purchase so that it may update the data on the rights currently for sale and on the rights currently owned.

Figure 6:
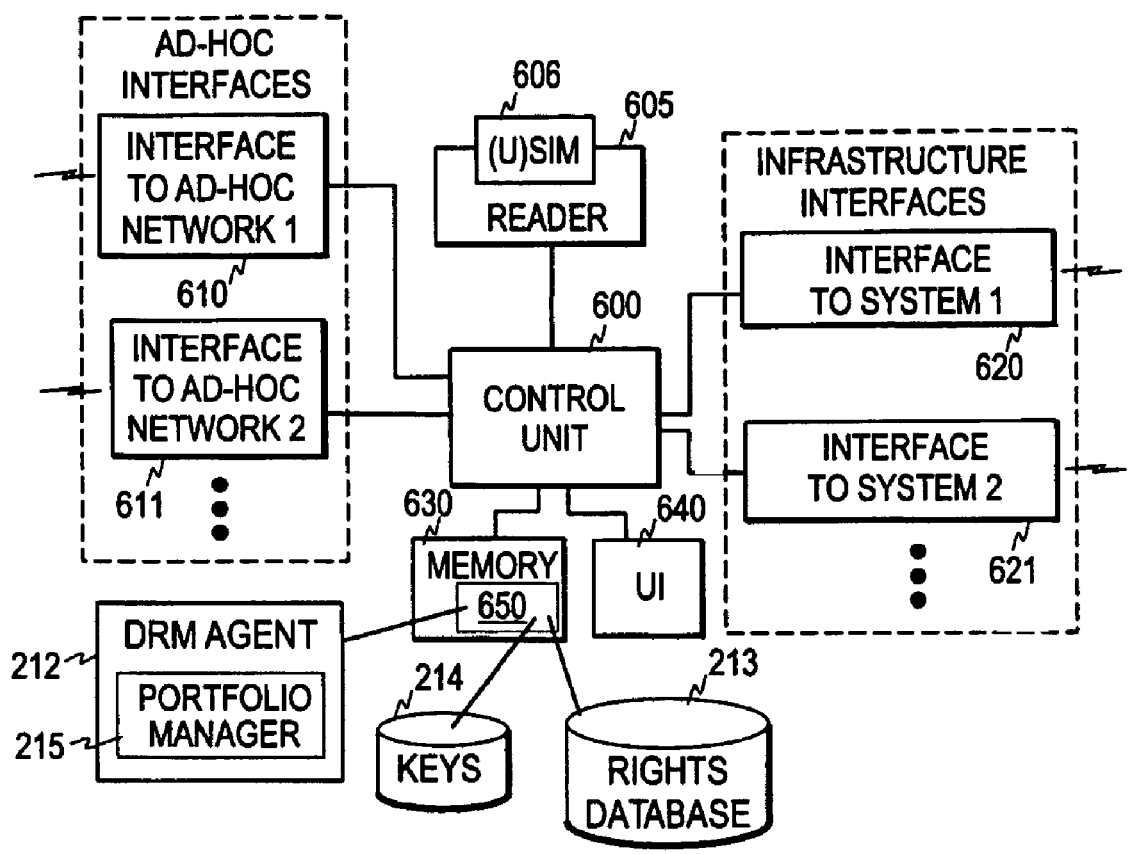
FIG. 6 illustrates the basic elements of a mobile terminal according to one embodiment of the invention.

FIG. 6 is a schematic presentation of one embodiment of a mobile terminal according to the invention. The core of the terminal is a control unit 600, which is connected to various interfaces of the terminal and to a memory unit 630. The mobile terminal may be an ad-hoc terminal, for example, in which case the interfaces of the terminal may be divided into two classes: interfaces for ad-hoc networks and interfaces for the network infrastructure. However, depending on the type of the mobile terminal, it may be provided with one infrastructure interface only, through which the terminal communicates with the access elements of an access network. In the case of an ad-hoc terminal, there are thus one or more interfaces 610, 611, each offering the functionality needed to accomplish connectivity to an ad-hoc network of a particular type. Several ad-hoc interfaces are necessary, at least whenever the mobile terminal acts as a trunk terminal that serves ad-hoc networks based on different radio technologies. For example, one ad-hoc network served may be based on WLAN technology, while another one may be based on Bluetooth or Ultra-Wideband (UWB) technology. If the terminal is an ad-hoc terminal but does not act as a trunk node, the communication with a trading server may occur through a trunk node.

The interfaces to the supporting infrastructure include one or more interfaces 620, 621 of which at least one is used to transfer packet data traffic through the access network.

The terminal normally also includes a card reader 605 into which an identity module, such as a (Universal Subscriber Module ((U)SIM), User Identity Module (UIM) or a (User) Integrated Circuit Card ((U)ICC) 606 can be inserted. The card reader and the memory unit are connected to the control unit in order that the control unit is able to read data from the identity module and from the memory unit and write data into the identity module and into the memory unit. In addition, the mobile terminal includes user interface means 640 for using the terminal. The user interface means typically include a display and a keypad.

The memory unit 630 includes a tamper-proof memory area 650 for storing the DRM agent and the key and rights databases. By executing DRM software and using the data stored in the memory unit and/or in the identity module, the control unit performs the above-described steps in connection with the selling and buying of rights. In connection with selling, the control unit thus accepts, through the user interface, the sales parameters forming the sell order, blocks the corresponding media object(s), creates the sell offer message to be sent to the trading server, and performs the steps necessary upon being informed of a sale. In connection with selling, the control unit handles, through the user interface means, the interaction with the user during the trading session.

The data processing environment of the control unit may resemble that of an ordinary PC, and the DRM software (i.e. DRM agent), including the novel features of the invention, may be delivered separately to the mobile terminal, for example in a multimedia card or by downloading the software through a communication network. It is also possible that the novel features, i.e. the program code of the portfolio manager, are delivered as a plug-in software module to terminals that are provided with conventional DRM client software. Although the plug-in module may be in the form of a removable memory card storing program code of the portfolio manager, the plug-in module may also be downloaded to the terminal via a communication network. The DRM software or the plug-in module may be downloaded directly to the mobile terminal or through a fixed terminal, such as a PC, from which the software module may further be transferred to the terminal.

In a further embodiment of the invention, the terminal does not transmit the sell offer automatically, but only blocks the media object. In this way, the user may ensure that a certain part of the rights is protected against consumption. The terminal may then inquire later if the user wishes to sell the preserved rights or release them for use.

Although the invention was described above with reference to the examples shown in the appended drawings, it is obvious that the invention is not limited to these, but may be modified by those skilled in the art without departing from the scope and spirit of the invention. For example, the terminal does not have to be a mobile terminal, but the invention may also be utilized in connection with fixed communication terminals. The communication environment may thus vary according to the terminal used.

The invention claimed is:

1. A method, comprising:
   upon acquiring rights of consumption of a media object, to consume the media object in a user-operated communication terminal, storing the media object and an associated rights object in the user-operated communication terminal, the rights object defining usage rules for the media object;
   accepting sales parameters from a user through a user interface of the user-operated communication terminal, the sales parameters indicating that the user is willing to sell the acquired rights of consumption of the media object to a certain extent for further consumption;
   maintaining information on consumption of the media object;
   in response to the accepting, checking whether the media object is consumed more than is defined by the usage rules and said certain extent; and
   when not, consuming the media object further in the user-operated communication terminal.

2. A method according to claim 1, further comprising:
   creating a sell offer based on the sales parameters, the sell offer identifying the media object and indicating said certain extent; and
   sending the sell offer to a trading entity.

3. A method according to claim 1, wherein the accepting comprises accepting at least one time constraint defining said certain extent.

4. A method according to claim 1, wherein the accepting comprises accepting at least one count constraint defining said certain extent.

5. A method according to claim 1, wherein the accepting comprises accepting price information.

6. A method according to claim 1, wherein the preventing comprises making the media object inaccessible.

7. A method according to claim 1, wherein the preventing comprises indicating a consumption limit after which the media object will be inaccessible.

8. A method according to claim 7, wherein the preventing further comprises making the media object inaccessible when the consumption limit is reached.

9. A method according to claim 7, wherein the indicating comprises modifying the rights object according to the consumption limit.

10. A method according to claim 9, wherein the indicating comprises storing at least one restriction information element in the user-operated communication terminal, the at least one restriction information element indicating the consumption limit.

11. A method according to claim 6, wherein the making comprises denying access to the rights object corresponding to the media object.

12. A method according to claim 6, wherein the making comprises storing at least one restriction information element indicating that the media object is inaccessible.

13. A method according to claim 7, wherein the indicating comprises storing at least one restriction information element indicating the consumption limit.

14. A method according to claim 2, further comprising:
awaiting a receipt of a transfer request from the trading entity, the transfer request indicating a network element to which the rights object is to be transferred.

15. An apparatus, comprising:
at least one processor; and
at least one memory including computer program code.,
wherein the at least one memory and the computer program code are configured to, with the at least one processor, cause the apparatus at least to:
store a media object and an associated rights object, the associated rights object defining usage rules for the media object for which rights of consumption have been acquired to consume the media object in the user-operated communication terminal,
accept sales parameters from a user through a user interface of the user-operated communication terminal, the sales parameters indicating that the user is willing to sell the acquired rights of consumption of the media object to a certain extent for further consumption, and
maintain information on consumption of the media object, and wherein the processor is configured, in response to the accepting, to check whether the media object is consumed more than is defined by the usage rules and said certain extent, and when not, consume the media object further in the user-operated communication terminal.

16. An apparatus according to claim 15, wherein the at least one memory and the computer program code are configured to, with the at least one processor, cause the apparatus at least to store the associated rights object.

17. An apparatus according to claim 15, wherein the at least one memory and the computer program code are configured to, with the at least one processor, cause the apparatus at least to allow the user to define the sales parameters.

18. An apparatus according to claim 16, wherein the at least one memory and the computer program code are configured to, with the at least one processor, cause the apparatus at least to store at least one restriction information element in the tamper-proof memory area, the at least one restriction information element indicating a consumption limit after which the media object will be inaccessible.

19. An apparatus according to claim 18, wherein the at least one memory and the computer program code are configured to, with the at least one processor, cause the apparatus at least to make the media object inaccessible when the consumption limit is reached.

20. An apparatus according to claim 16, wherein the at least one memory and the computer program code are configured to, with the at least one processor, cause the apparatus at least to store at least one restriction information element in the tamper-proof memory area, the at least one restriction information element indicating that the media object is inaccessible.

21. An apparatus according to claim 16, wherein the at least one memory and the computer program code are configured to, with the at least one processor, cause the apparatus at least to modify the rights object.

22. An apparatus according to claim 16, wherein the at least one memory and the computer program code are configured to, with the at least one processor, cause the apparatus at least to create a sell offer based on the sales parameters, the sell offer identifying the media object and indicating said certain extent, and send the sell offer to a trading entity on a communication network.

23. An apparatus according to claim 16, wherein the at least one memory and the computer program code are configured to, with the at least one processor, cause the apparatus at least to compare the sales parameters with the usage rules to check whether the sales parameters are acceptable.

24. A computer program embodied on a non-transitory computer readable medium to enable a user-operated communication terminal to control consumption of a media object for which rights of consumption have been acquired to consume the media object in the user-operated communication terminal, the media object being stored in the user-operated communication terminal together with an associated rights object defining usage rules for the media object, the computer program executing:
accepting sales parameters through a user interface of the user-operated communication terminal, the sales parameters indicating that a user of the user-operated communication terminal is willing to sell the acquired rights of consumption of the media object to a certain extent for further consumption;
maintaining information on consumption of the media object;
in response to the accepting, checking whether the media object is consumed more than is defined by the usage rules and said certain extent; and
when not, consuming the media object further in the user-operated communication terminal.

25. A computer program according to claim 24, further executing:
storing computer readable program code in a memory card insertable to the user-operated communication terminal.

26. A computer program according to claim 24, further executing:
storing computer readable program code in the user-operated communication terminal.

* * * * *